(12) United States Patent
Sofia et al.

(10) Patent No.: US 11,562,080 B2
(45) Date of Patent: Jan. 24, 2023

(54) SECURE INGRESS AND EGRESS OF DATA FIELDS THROUGH LEGACY COMPUTER SYSTEMS

(71) Applicant: International Business Machines Corporation, Armonk, NY (US)

(72) Inventors: Anthony Thomas Sofia, Hopewell-Junction, NY (US); Michael Joseph Jordan, Woodstock, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 16/869,727

(22) Filed: May 8, 2020

(65) Prior Publication Data

US 2021/0350008 A1    Nov. 11, 2021

(51) Int. Cl.
*G06F 21/60* (2013.01)
*H04L 9/40* (2022.01)

(52) U.S. Cl.
CPC ............ *G06F 21/602* (2013.01); *H04L 63/20* (2013.01)

(58) Field of Classification Search
CPC ............................... G06F 21/602; H04L 63/20
USPC ......................................................... 713/164
See application file for complete search history.

(56) References Cited

U.S. PATENT DOCUMENTS

| 9,832,024 | B2 | 11/2017 | Xu et al. | |
| 11,475,108 | B2* | 10/2022 | Nethery | G06F 7/58 |
| 2014/0215490 | A1* | 7/2014 | Mathur | G16H 10/60 |
| | | | | 719/313 |
| 2017/0104723 | A1* | 4/2017 | Merritt | H04L 63/0281 |
| 2018/0054490 | A1* | 2/2018 | Wadhwa | G08G 1/0116 |
| 2020/0036610 | A1* | 1/2020 | Indiresan | H04L 63/20 |
| 2020/0225978 | A1* | 7/2020 | Feroz | H04L 63/0876 |

FOREIGN PATENT DOCUMENTS

WO    2017066144 A1    4/2017

OTHER PUBLICATIONS

Fielding et al., ip.com, "Hypertext Transfer Protocol (HTTP/1.1): Message Syntax and Routing (RFC7230)", 2019, pp. 1-90 (Year : 2019).*
Riaz et al., 2020 IEEE 29th International Conference on Computer Communications and Networks (ICCCN), "Sec-ALG: An Open-source Application Layer Gateway for Secure Access to Private Networks", pp. 1-11 (Year: 2020).*
Transmittal Form PTO/SB/21 signed May 8, 2020.

(Continued)

*Primary Examiner* — Khalil Naghdali
(74) *Attorney, Agent, or Firm* — Cantor Colburn LLP; Edward Wixted (57) ABSTRACT

Aspects include receiving an outbound payload for output to a requestor as part of a response to a call by the requestor to an application programming interface (API). Clear data in the outbound payload is selected for encryption based on policy information. The clear data is encrypted to generate encrypted data, and the encrypted data is inserted into the outbound payload in place of the clear data to generate an updated outbound payload. The response, including the updated outbound payload, is sent to the requestor.

12 Claims, 6 Drawing Sheets

(56) References Cited

OTHER PUBLICATIONS

Shafagh et al., "Privacy-preserving quantified self: secure sharing and processing of encrypted small data" RIGHTSLINIK, https://dl.acm.org/doi/pdf/10.1145/3097620.3097625?download=true, Aug. 2017, 6 pages.

Wang, "Cryptographically enforced access control for user data in untrusted clouds" Submitted to the Department of Electrical Engineering and Computer Science in partial fulfillment of the requirements for the degree of Master of Science at the Assachusetts Institute of Technology, https://dspace.mit.edu/bitstream/handle/1721.1/103669/953457139-MIT.pdf?sequence=1&isAllowed=y, Feb. 2016, 60 pages.

* cited by examiner

SECURE INGRESS AND EGRESS OF DATA FIELDS THROUGH LEGACY COMPUTER SYSTEMS

BACKGROUND

The present invention generally relates to computer systems, and more specifically, to the secure ingress and egress of data fields through legacy computer systems.

In the computer field, the term legacy is used to describe existing technology and applications that are being used by an individual or organization. When new technology or applications are introduced into a computing environment, they often have to interact with legacy systems to perform particular functions and/or to retrieve data. In many cases, legacy systems are left intact and bridges are built to/from the legacy systems using interfaces such as application programming interfaces (APIs).

SUMMARY

Embodiments of the present invention are directed to providing secure ingress and egress of data fields through legacy computer systems. A non-limiting example method includes receiving an outbound payload for output to a requestor as part of a response to a call by the requestor to an application programming interface (API). Clear data in the outbound payload is selected for encryption based on policy information. The clear data is encrypted to generate encrypted data, and the encrypted data is inserted into the outbound payload in place of the clear data to generate an updated outbound payload. The response, including the updated outbound payload, is sent to the requestor.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide secure ingress and egress of data fields through legacy computer systems. Legacy systems can participate in hybrid cloud applications by providing access to data and functions of the legacy systems through application programming interface (API) calls. Some data that is returned in response to these API calls may include information that should remain confidential while that data is outside of the legacy system. The hybrid processing can take place and retain that confidential information, however that information may need to be used as part of a future request back to the legacy system. In this case, the legacy system needs to be able to resolve that value (e.g., translate it into a clear or unencrypted value) in order to process the transaction.

In accordance with one or more embodiments of the present invention, a subset of values, or data fields, in an API response from a legacy system are protected (e.g., encrypted) before being sent back to the requestor based on policy information about the data fields. If the encrypted values are returned back to the legacy system via an API request, the values will be opened up (e.g., unencrypted) and then processed as clear data in the legacy system.

One or more embodiments of the present invention provide a method for protecting data as part of an outbound API call from a legacy system. The response from the legacy system is parsed through the API and selected individual fields are protected using encryption. The key(s) used for the encryption can be stored, for example, in a secure location and/or referenced through metadata that is included in the encrypted data. On an inbound, or incoming, API call from a requestor into the legacy system, the payload is scanned to find the protected (e.g., encrypted) data field(s). The protected data field is decrypted and inserted into the payload so that the back-end, or legacy, system can operate with clear (unencrypted) data.

An example of a type of API call that can be used by one or more embodiments of the present invention is a RESTful API. Representational state transfer (REST) is a software architectural style that defines a set of constraints to be used for creating web services. APIs that conform to the REST architectural style, call RESTful APIs, provide interoperability between computer systems on the Internet. Embodiments are not limited to RESTful APIs as any other suitable API can be utilized by one or more embodiments of the present invention.

Figure 1:
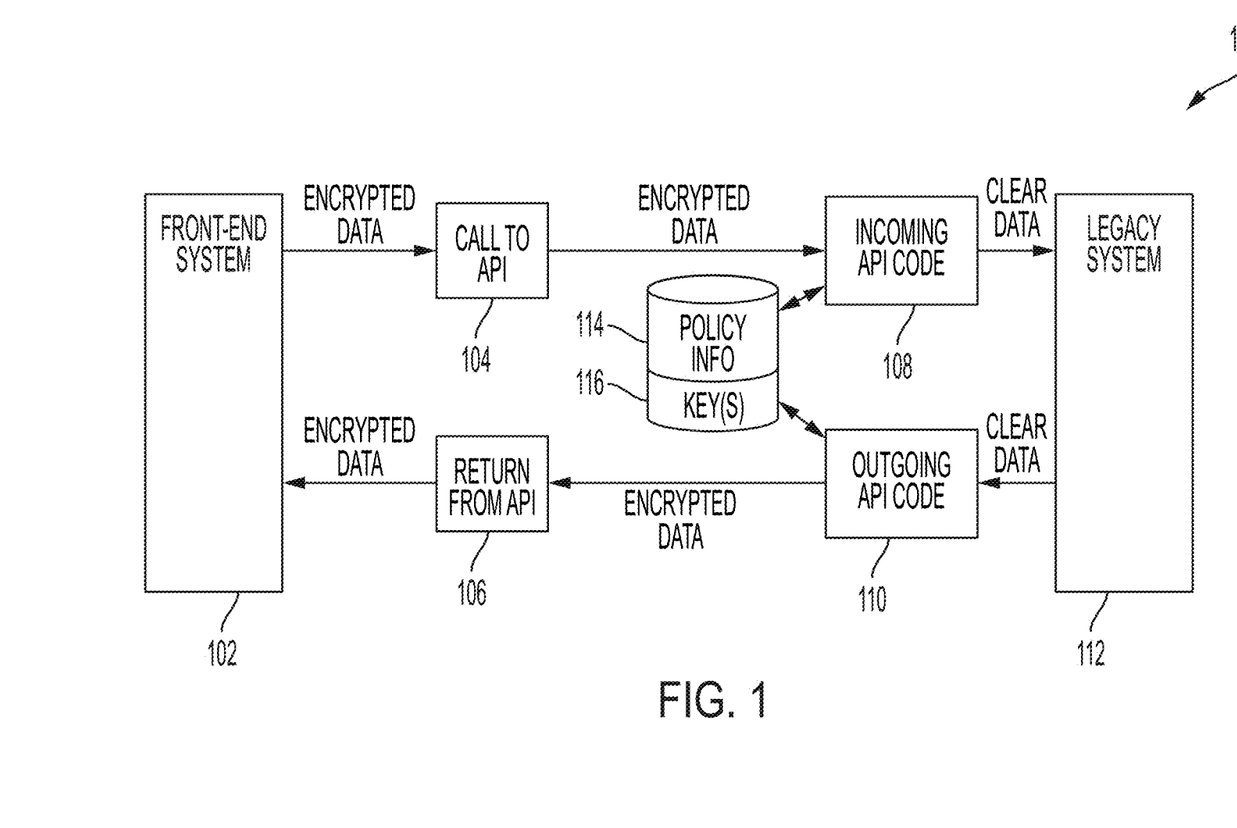
FIG. 1 depicts a block diagram of a system for providing secure ingress and egress of data fields through legacy computer systems according to one or more embodiments of the present invention.

Turning now to FIG. 1, a block diagram 100 of a system for providing secure ingress and egress of data fields through legacy computer systems is generally shown in accordance with one or more embodiments of the present invention. The block diagram 100 shown in FIG. 1 includes a front-end system 102 and a backend system, or legacy system 112, as well as a database that includes policy information 114 and one or more keys 116 for use in encrypting data fields. The policy information 114 and key(s) 116 can be stored in a storage device in a database format or any other type of data structure. In accordance with one or more embodiment of the present invention, the policy information 114 applies to any APIs that access the legacy system 112. In accordance with one or more embodiments of the present invention, different policy information 114 applies to different business units and/or to different calling front-end systems 102.

Block diagram 100 also includes call to API code 104, return from API code 106, incoming API code 108, and outgoing API code 110. As shown in FIG. 1, the front-end system 102 (also referred to herein as a "requestor") communicates with the legacy system 112 by initiating the call to API code 104. The call to API code 104 is shown as a separate component from the front-end system 102 in FIG. 1, however the call to API code 104 can be included as part of the front-end system 102. The front-end system 102, via the call to API code 104, may be transmitting data for storage via the legacy system 112, requesting data from the legacy system 112, and/or initiating the execution of a function by the legacy system 112, etc. As shown in FIG. 1, at least a portion of the data used to interact with the legacy system 112 is encrypted data.

In accordance with one or more embodiments of the present invention, the front-end system 102 receives encrypted data and performs processing on the encrypted data and thus, does not require a key to encrypt or to decrypt the data.

In an example, the front-end system 102 is executing on an automated teller machine (ATM) and the legacy system 112 is executing on a host machine of a bank. In this example, the call to API code 104 initiates a request to dispense $100 in cash to a customer with a specified customer account number. In addition, in this example, the data fields that include the location of the ATM and the dollar amount ($100) being withdrawn are sent via the call to API code 104 as clear data (not encrypted) and the data field that includes the customer account number that is sent via the call to API code 104 is encrypted data.

FIG. 1 also includes incoming API code 108 which receives the API call (including a payload that includes any data field(s)) from the call to API code 104. The incoming API code 108 is shown as a separate component from the legacy system 112 in FIG. 1, however the incoming API code 108 can be included as part of the legacy system 112. As shown in FIG. 1, the incoming API code 108 is coupled to a storage location containing a key(s) 116 (or a pointer to a location of the key) that is used to decrypt any encrypted data fields in the payload to generate clear data for input to the legacy system 112. In accordance with one or more embodiments of the present invention, the incoming API code 108 is also coupled to a storage location containing the policy information 114 which is used by the incoming API code 108 to identify the encrypted data fields in the payload. The policy information 114 and/or the key(s) 116 may be stored in the legacy system 112.

In accordance with one or more embodiments of the present invention, the incoming API code 108 uses metadata included in the encrypted data fields instead of or in addition to the policy information 114 to determine the key to be used to decrypt the encrypted data. In accordance with one or more embodiments of the present invention, the metadata includes an indicator that a particular data field is encrypted.

Referring to the example above about an ATM communicating to a banking system, incoming API code 108 receives a payload that includes the location of the ATM and the dollar amount ($100) as unencrypted data fields and the customer account number as an encrypted data field. The incoming API code 108 can recognize that the customer account number field is encrypted based on the policy information 114 indicating that the customer account number field is always encrypted when the API is called from an ATM. The incoming API code 108 locates the key(s) 116 to decrypt the customer account number field, uses the key(s) to decrypt the customer account number field, and replaces the encrypted customer account number field in the payload with the unencrypted customer account number field. The updated payload with unencrypted data fields is sent to the banking system (e.g., legacy system 112) along with the request to dispense the specified amount of cash ($100) to the customer (with the specified customer account number).

When the legacy system 112 has completed the processing specified by the API, it returns data to the requestor (in this case the front-end system 102) via outgoing API code 110. Before returning the data (e.g., via an outbound payload) the outgoing API code 110 encrypts any unencrypted data fields that are indicated in the policy information 114 as requiring encryption before being sent to the requestor. The outgoing API code 110 can use the key(s) 116 specified by the policy information 114 to encrypt the indicated data fields. Once the data fields requiring encryption (as specified for example by the policy information 114) are encrypted, the results of the API call including the encrypted payload are returned to the front-end system 102 via the return from API code 106.

Referring to the example of the ATM communicating with the banking system, the banking system receives the unencrypted payload and the request to dispense the specified amount of cash ($100) to the customer (with the specified customer account number). In response, the banking system may perform several operations such as verifying the customer account number and verifying that there is at least $100 in the customer account. The banking system may then send a response to the requestor via the outgoing API code 110 which will access the policy information 114 which indicates that the customer account number has to be encrypted before sending a response to the requestor, or initiator of the API at the ATM. The outgoing API code 110 encrypts the customer account number field using a specified key(s) 116 and sends the payload to the ATM via the return from API code 106. In this example, the payload may include the encrypted customer account number field, an unencrypted location of the ATM field, an unencrypted dollar amount ($100) field; and an unencrypted authorization field indicating whether the transaction is authorized by the banking system.

The example of the ATM and banking system provided herein is a simplified example that is presented for ease of description and not intended to limit embodiments of the invention to banking applications, as one skilled in the art will recognize that embodiments may be utilized for API calls between any computer systems.

In accordance with one or more embodiments of the present invention, the policy information 114 keeps track of what data fields are encrypted when they are received by the incoming API code 108 and that require decryption before being operating on by the legacy system 112 in a clear data format. In addition, the policy information 114 keeps track of which (if any) data fields returned by the legacy system 112 require encryption by the outgoing API code 110 before they are sent back to the requestor.

In accordance with one or more embodiments of the present invention, only a subset of the encrypted data fields are unencrypted before being sent to the legacy system 112. Which data fields are utilized by the legacy system 112 in unencrypted format can be tracked by the policy information 114.

Any type of encryption algorithm involving one or more keys may be utilized to encrypt the data. Examples include, but are not limited to, variants of the advanced encryption scheme (AES), data encryption standard (DES), and/or Rivest, Shamir, and Adleman (RSA) encryption.

Any of the components shown in FIG. 1 may be coupled via a network. For example, call to API code 104 maybe coupled to incoming API code 108 via a network, policy information 114 may be coupled to outgoing API code 110 via a network, and/or outgoing API code 110 may be coupled to legacy system 112 via a network. The network(s) may be implemented by any network(s) known in the art such as, but not limited to a local area network (LAN), a direct cable connection, a cloud computing environment such as that shown below in FIG. 4, and/or the Internet.

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments. In addition, the various blocks in FIG. 1 may be configured in a different manner than that shown in FIG. 1. For example, the call to API code 104, return from API code 106 and front-end system 102 may all be part of the same component.

Figure 2:
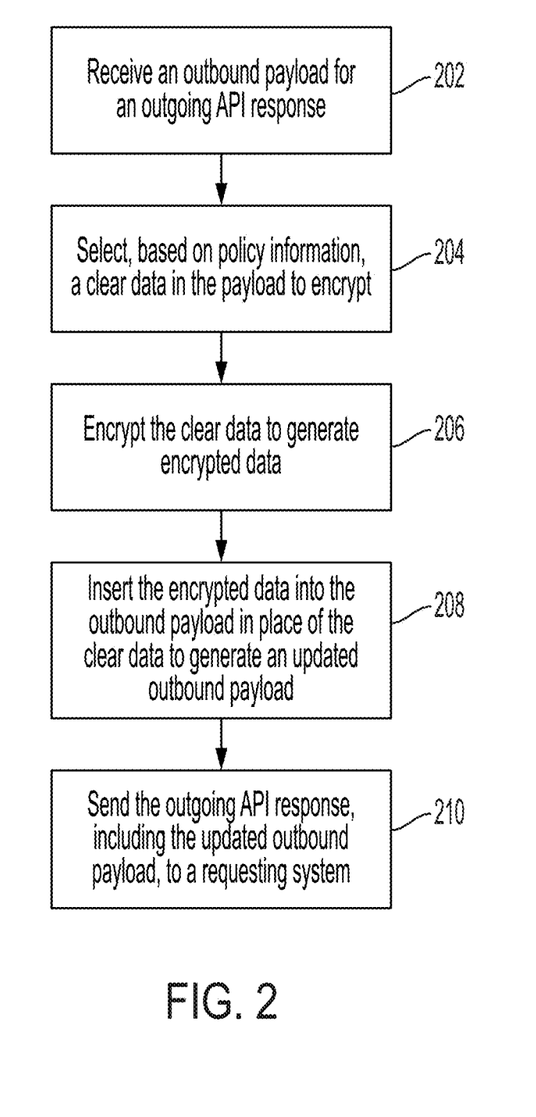
FIG. 2 depicts a flow diagram of handling an outbound payload for an outgoing application programming interface (API) response according to one or more embodiments of the present invention.

Turning now to FIG. 2, a flow diagram of a method 200 of handling an outbound payload for an outgoing API response is generally shown in accordance with one or more embodiments of the present invention. All or a portion of the processing shown in FIG. 2 can be performed, for example, by outgoing API code, such as outgoing API code 110 of FIG. 1 executing on processor 605 located on computer 601 of FIG. 6 or executing on a processor located on a cloud computing node 10 of FIG. 4. In accordance with one or more embodiments of the present invention, the method shown in FIG. 2 is performed after an API call has been made to a legacy system, such as legacy system 112 of FIG. 1 and the legacy system has completed the task requested by the requestor. The method 200 of FIG. 2 is performed to return data back to the requestor of the API in a format the protects the security of the data.

The process shown in FIG. 2 starts with receiving an outbound payload for an outgoing API response at block 202. As described previously, the legacy system 112 may process one or more data fields in an unencrypted format. These data fields may contain data that should be protected before being sent out on a network due to the nature of the data and/or the security of networks transmitting the data. At block 204, it is determined which (if any) of the clear data fields in the payload need to be encrypted before being returned to the requestor. The code processing the outbound API response can access policy information, such as policy information 114 of FIG. 1, to determine which data fields require encryption.

At block 206, the data fields requiring encryption are encrypted using encryption keys, such as keys 116 of FIG. 1. These encrypted data fields are inserted into the payload in place of their corresponding clear data fields at block 208 to generate an encrypted payload. In this manner, data fields requiring encryption when being transmitted across networks are protected. In accordance with one or more embodiments, the requestor (e.g., front end system 102) may not have access to the clear data version for particular data fields and these data fields may be operated on while in an encrypted format by the requestor. At block 210, the outgoing API response, including the updated outbound payload, is transmitted to the requestor, such as front-end system 102 of FIG. 1.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
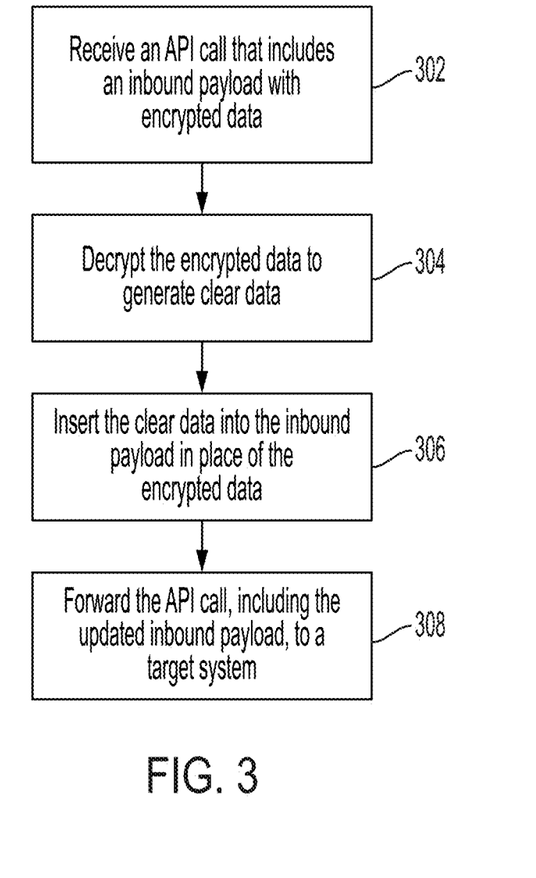
FIG. 3 depicts a flow diagram of handling an API call that includes an inbound payload with encrypted data according to one or more embodiments of the present invention.

Turning now to FIG. 3, a flow diagram of a method 300 of handling an API call that includes an inbound payload with encrypted data is generally shown in accordance with one or more embodiments of the present invention. All or a portion of the processing shown in FIG. 3 can be performed, for example, by incoming API code, such as incoming API code 108 of FIG. 1, executing on processor 605 located on computer 601 of FIG. 6 or executing on a processor located on a cloud computing node 10 of FIG. 4.

At block 302, an API call that includes an inbound payload with encrypted data is received. As described previously, the legacy system 112 may receive one or more data fields as part of an API call from a requestor (e.g., in a requestor payload) that are in an encrypted format. The legacy system 112 may require the data fields to be in an unencrypted, or clear format, for processing by the legacy system 112.

At block 304, the encrypted data field(s) in the inbound payload that require decryption is identified and decrypted to generate clear data. The data field(s) that is encrypted and that is required to be in clear data format for processing by the legacy system can be identified based on the policy information 114 associated with the API call and/or associated with a particular data field within the inbound payload. The key(s) used to decrypt the identified data field can be obtained from a storage location and/or can be identified based on metadata contained in the identified data fields. In accordance with one or more embodiments of the present invention, a handle to the key is obtained from the storage location or the metadata. The format of the handle can vary depending on the key system being used.

At block 306, the decrypted, or clear, data is inserted into the inbound payload in place of the encrypted data. At block 308, the API call, including the updated inbound payload, is forwarded to a target system, such as legacy system 112 of FIG. 1. The legacy system can then perform the processing specified by the API using data in the format that is expected (e.g., clear data).

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
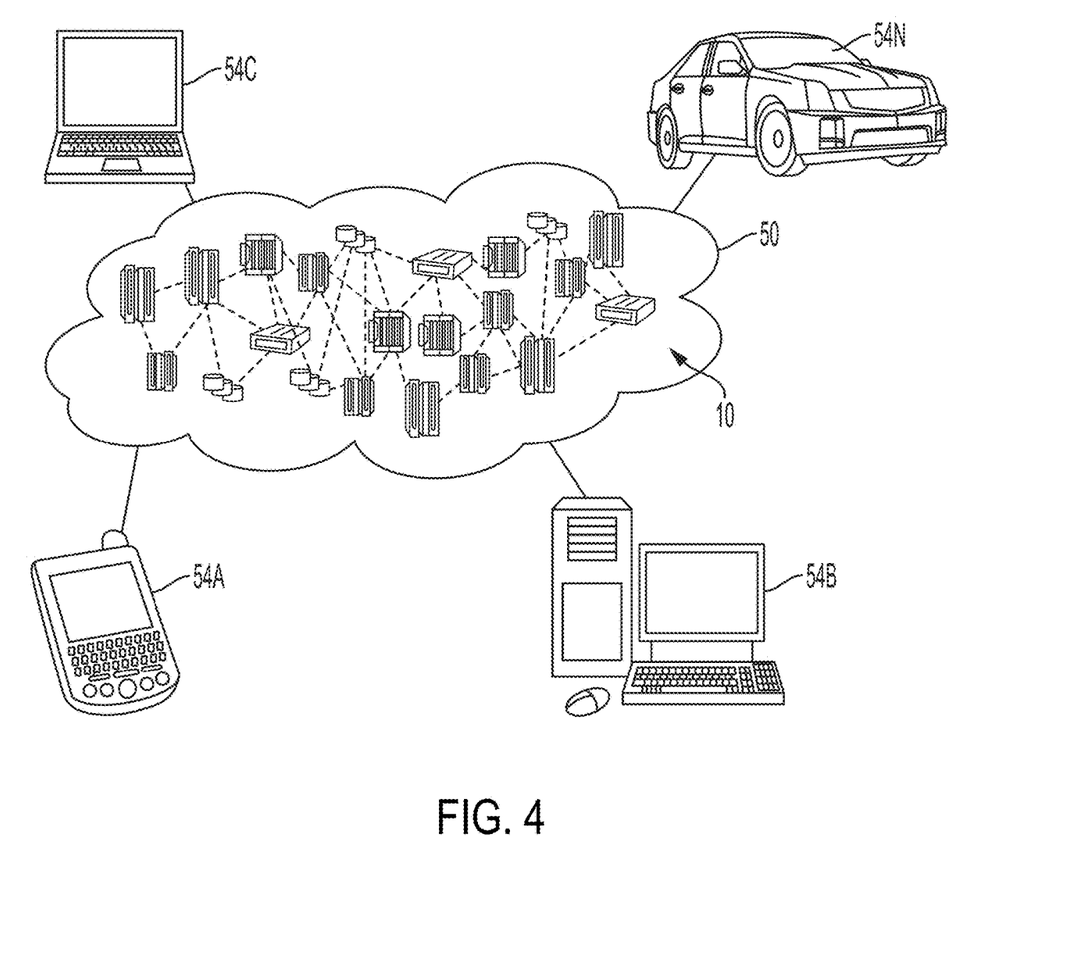
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
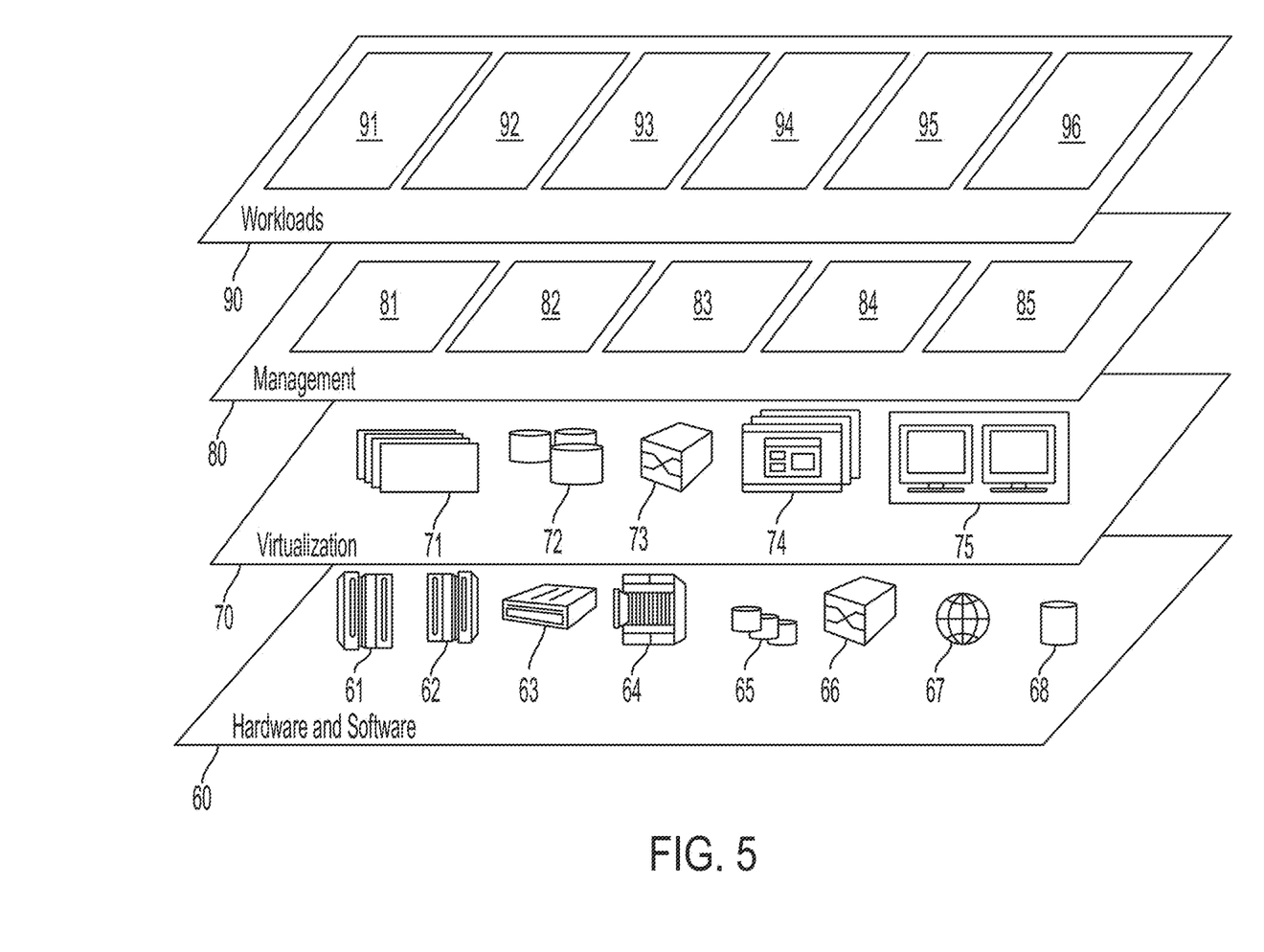
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and breakpoint generation 96.

It is understood that one or more embodiments of the present invention are capable of being implemented in conjunction with any type of computing environment now known or later developed.

Figure 6:
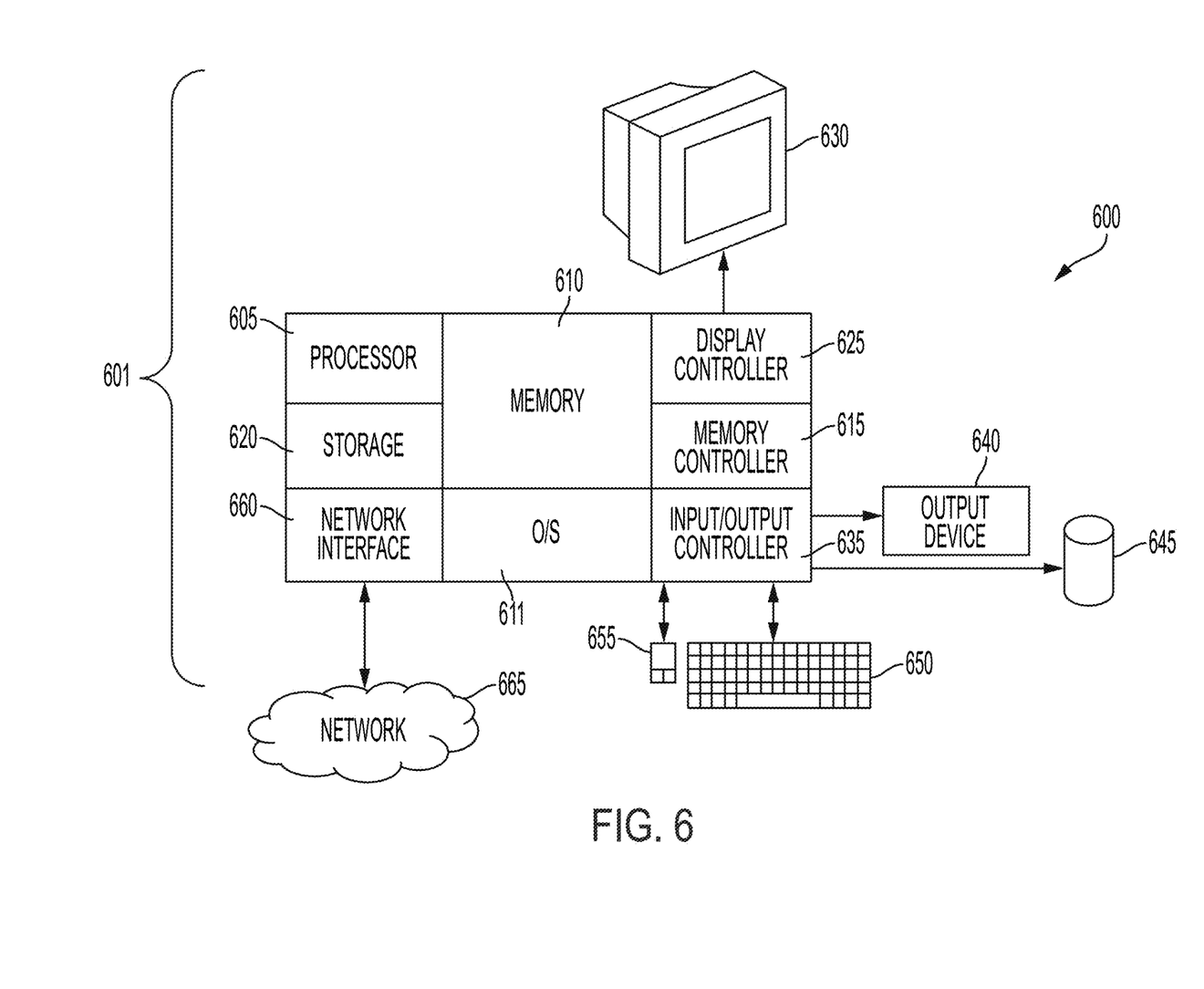
FIG. 6 illustrates a system for providing self-reporting and self-upgrading of enterprise systems according to one or more embodiments of the present invention.

Turning now to FIG. 6, a computer system 600 for providing the secure ingress and egress of data fields through legacy computer systems is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   receiving an outbound payload for output to a requestor as part of a response to a call by the requestor to an application programming interface (API);
   selecting, based on policy information, clear data in the outbound payload to encrypt, wherein the clear data selected for encryption is a subset of the outbound payload;
   encrypting the clear data to generate encrypted data;
   inserting the encrypted data into the outbound payload in place of the clear data to generate an updated outbound payload;
   sending the response to the requestor, the response comprising the updated outbound payload;
   receiving the call to the API, the call to the API comprising an inbound payload that includes second encrypted data;
   decrypting the second encrypted data to generate second clear data;
   inserting the second clear data into the inbound payload in place of the second encrypted data to generate an updated inbound payload; and
   forwarding the call to the API to a target system, the forwarded call comprising the updated inbound payload.

2. The method of claim 1, wherein the second encrypted data includes metadata and a value of a key used for the decrypting is determined based at least in part on the metadata.

3. The method of claim 1, wherein the clear data is encrypted based at least in part on a value of a key.

4. The method of claim 1, wherein the clear data selected for encryption is a subset of the clear data in the outbound payload.

5. The method of claim 1, wherein the API is a RESTful API.

6. A system comprising:
   one or more processors for executing computer readable instructions, the computer readable instructions controlling the one or more processors to perform operations comprising:
   receiving an outbound payload for output to a requestor as part of a response to a call by the requestor to an application programming interface (API);
   selecting, based on policy information, clear data in the outbound payload to encrypt, wherein the clear data selected for encryption is a subset of the outbound payload;
   encrypting the clear data to generate encrypted data;
   inserting the encrypted data into the outbound payload in place of the clear data to generate an updated outbound payload;
   sending the response to the requestor, the response comprising the updated outbound payload;
   receiving the call to the API, the call to the API comprising an inbound payload that includes second encrypted data;
   decrypting the second encrypted data to generate second clear data;
   inserting the second clear data into the inbound payload in place of the second encrypted data to generate an updated inbound payload; and
   forwarding the call to the API to a target system, the forwarded call comprising the updated inbound payload.

7. The system of claim 6, wherein the second encrypted data includes metadata and a value of a key used for the decrypting is determined based at least in part on the metadata.

8. The system of claim 6, wherein the clear data is encrypted based at least in part on a value of a key.

9. The system of claim 6, wherein the clear data selected for encryption is a subset of the clear data in the outbound payload.

10. The system of claim 6, wherein the API is a RESTful API.

11. A computer program product comprising a non-transitory computer readable storage medium having program instructions embodied therewith, the program instructions executable by one or more processors to cause the one or more processors to perform operations comprising:
    receiving an outbound payload for output to a requestor as part of a response to a call by the requestor to an application programming interface (API);
    selecting, based on policy information, clear data in the outbound payload to encrypt, wherein the clear data selected for encryption is a subset of the outbound payload;
    encrypting the clear data to generate encrypted data;
    inserting the encrypted data into the outbound payload in place of the clear data to generate an updated outbound payload;
    sending the response to the requestor, the response comprising the updated outbound payload;
    receiving the call to the API, the call to the API comprising an inbound payload that includes second encrypted data;
    decrypting the second encrypted data to generate second clear data;
    inserting the second clear data into the inbound payload in place of the second encrypted data to generate an updated inbound payload; and
    forwarding the call to the API to a target system, the forwarded call comprising the updated inbound payload.

12. The computer program product of claim 11, wherein the second encrypted data includes metadata and a value of a key used for the decrypting is determined based at least in part on the metadata.

* * * * *